United States Patent
Taketsugu

(10) Patent No.: US 6,539,233 B1
(45) Date of Patent: Mar. 25, 2003

(54) CALL CONTROL METHOD IN MOBILE COMMUNICATION AND SYSTEM THEREFOR

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,809

(22) Filed: Jan. 7, 2000

(30) Foreign Application Priority Data

Jan. 8, 1999 (JP) .......................................... 11-002980

(51) Int. Cl.[7] .............................. H04B 7/00; H04Q 7/20
(52) U.S. Cl. ........................ 455/522; 455/69; 455/436; 455/437; 455/442
(58) Field of Search ........................ 455/69, 522, 439, 455/437, 442, 444, 436

(56) References Cited

U.S. PATENT DOCUMENTS

| | | | |
|---|---|---|---|
| 5,267,261 A | 11/1993 | Blakeney, II et al. ............ 375/1 |
| 5,564,075 A | 10/1996 | Gourgue | |
| 5,646,937 A | * 7/1997 | Nakano et al. .............. 370/252 |
| 5,710,974 A | 1/1998 | Granlund et al. ........... 455/33.2 |
| 5,771,451 A | * 6/1998 | Takai et al. .................. 455/442 |
| 5,774,809 A | 6/1998 | Tuutijarvi et al. ........... 455/437 |
| 5,809,430 A | * 9/1998 | D'Amico .................... 455/525 |
| 6,029,070 A | * 2/2000 | Kingdon et al. ............. 455/456 |
| 6,064,890 A | * 5/2000 | Hirose et al. ................ 455/513 |
| 6,141,555 A | * 10/2000 | Sato ............................ 455/437 |
| 6,175,745 B1 | * 1/2001 | Bringby et al. ............. 455/522 |

FOREIGN PATENT DOCUMENTS

| | | |
|---|---|---|
| WO | 97/08910 | 3/1997 |
| WO | 99/04593 | 1/1999 |
| WO | 99/60797 | 11/1999 |

* cited by examiner

Primary Examiner—Thanh Cong Le
Assistant Examiner—Tuan Tran
(74) Attorney, Agent, or Firm—Foley & Lardner

(57) ABSTRACT

A mobile terminal (30) receives pilot channels from both of radio base stations (20 and 21) when it is located in a boundary region between radio zones (20a and 21a). Upon call origination, the mobile terminal (30) calculates a propagation loss (Ptx0–Prx0) given by a difference between transmission power level information (Ptx0) stored in the pilot channel of the radio base station (20) and a reception field strength (Prx0) actually received. Likewise, the mobile terminal (30) calculates a propagation loss (Ptx1–Prx1) as a difference between transmission power level information (Ptx1) stored in the pilot channel from the radio base station (21) and a reception field strength (Prx1) actually received. Then, the mobile terminal (30) compares the propagation losses calculated for the radio base stations (20 and 21). A call is originated to one of the radio base stations (20 and 21) which has a smaller value in the above-mentioned comparison.

12 Claims, 14 Drawing Sheets

| RADIO BASE STATION IDENTIFIER | RADIO CHANNEL IDENTIFIER | TRANSMISSION POWER LEVEL INFORMATION | RADIO BASE STATION INFORMATION |
|---|---|---|---|

FIG. 4

| RADIO BASE STATION IDENTIFIER | RADIO CHANNEL IDENTIFIER | CALL ORIGINATING TRANSMISSION POWER LEVEL INFORMATION | MULTIPLE ACCESS TRANSMISSION POWER LEVEL INFORMATION | RADIO BASE STATION INFORMATION |
|---|---|---|---|---|

FIG. 17

CALL CONTROL METHOD IN MOBILE COMMUNICATION AND SYSTEM THEREFOR

BACKGROUND OF THE INVENTION

This invention relates to a personal digital cellular telecommunication system (PDC) using a code division multiple access (CDMA) system and, in particular, to a call control method for use in mobile communication to fix a radio zone upon call origination at a mobile terminal irrespective of a communication traffic and to a system therefor.

In a conventional mobile/hand-held cellular telecommunication system, a plurality of service areas (PDC/cell, PHS [personal handyphone system]/microcell) are continuously formed to enable connection of a communication line upon continuous movement of a mobile terminal. In each radio service area (may be referred to as a radio zone), a single radio base station (cell base station) accommodated in a mobile communication control station via a wired or a wireless line or channel (WILL system) is arranged. The mobile terminal moves between the radio zones from one to another. In a CDMA system for example, the radio base station notifies information such as an identifier assigned to the station and an available radio channel by continuously transmitting the information via a radio channel called a pilot channel.

Moving in the radio zone of each radio base station, the mobile terminal at first receives the pilot channel and also receives and collects the information of peripheral radio base stations. Upon call origination, the mobile terminal originates a call to a particular radio base station having a strongest reception field strength (RSSI (Reception Signal Strength Indicator)) among the information of the radio base stations collected as mentioned above, and starts communication therewith. Each radio base station can use a plurality of radio channels and determines a radio channel to be used with reference to a radio wave propagation state between the station and the mobile terminal to communicate therewith.

If the radio wave propagation state of a current radio channel being used is deteriorated during communication, i.e., upon occurrence of decrease in reception field strength (RSSI) or deterioration in quality data (QI (Quality Indicator)) representative of presence/absence of word errors, the current radio channel is switched into another radio channel. Specifically, a mobile assisted handover procedure is executed to switch the current radio channel being involved in communication into another radio channel so that no line interruption occurs. Proposal is also made of a method (diversity handover) in which a same signal is transmitted from a plurality of radio base stations to a mobile terminal and the mobile terminal selects a particular reception signal among a plurality of reception signals (see Masuhito AKEBI et al "Handover Control Schemes Using Micro-Diversity Techniques for Microcellular Communications Systems", Technical Report of IEICE, RCS 93–86, 1994).

In a CDMA mobile communication system, diversity handover may be called soft handover. In the CDMA, mobile communication system of an IS-95 standard, transmission is carried out under closed/open loop control for fixing transmission power of the pilot channel. In addition, a particular mobile terminal controls connection of a radio base station upon soft handover by the use of a peripheral zone set including the information of the pilot channels of the peripheral radio zones and an active set of a combination of the radio base stations simultaneously connected to the mobile terminal.

As conventional mobile communication systems of the type, "CDMA Radio Transmission System and Transmission Power Control Device and Transmission Power Controlling Measuring Device Used in the System" is disclosed in Japanese Unexamined Patent Publication (JP-A) No. H10-56421 and "Mobile Communication System" is disclosed in Japanese Patent No. 2739850.

If the control is carried out to fix the transmission power of the pilot channel in the conventional systems described above, variation in communication/control traffic in and out of each radio zone causes the fluctuation in reception quality of the pilot channel at the mobile terminal. This results in variation in area of the radio zone. In other words, it is required to provide a control method for fixing the area of the radio zone upon call origination at the mobile terminal irrespective of the communication/control traffic.

If the mobile terminal transmits an access request (or a connection request) to a particular radio base station for multiple access on the basis of the above-mentioned peripheral radio zone set, the particular radio base station as a requested station determines allowance/rejection of the multiple access request, taking into account the communication traffic at the station and the communication quality, and notifies the result of determination to the mobile terminal. However, production of such control signal also constitutes a factor of deterioration of the communication quality. In the above-mentioned call control method, a mobile terminal during soft handover and a mobile terminal originating a new call are similarly dealt with. This increase a call loss ratio.

Systems disclosed as conventional systems in the above-mentioned publications have similar problems.

SUMMARY OF THE INVENTION

It is an object of this invention to provide a call control method in mobile communication and a system therefor, which are capable of starting stable communication.

It is another object of this invention to provide a call control method in mobile communication and a system therefor, which are capable of fixing a call origination allowable area irrespective of a downlink communication traffic.

It is still another object of this invention to provide a call control method in mobile communication and a system therefor, in which a mobile terminal can produce a multiple access request in correspondence to a propagation loss.

It is yet another object of this invention to provide a call control method in mobile communication and a system therefor, in which a radio base station can control whether or not the station acts as a multiple access destination depending upon the communication traffic of the station without carrying out useless call control.

It is a further object of this invention to provide a call control method in mobile communication and a system therefor, which is capable of assuring, in case where a call setup request is produced by a mobile terminal when a communication traffic at a radio base station exceeds a threshold level, a communication capacity for a requested call to decrease a call loss ratio by suppressing the possibility that the radio base station acts as a multiple access destination.

According to this invention, there is provided a call control method in mobile communication in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations carries out:

a step of storing pilot channel transmission power level information into the pilot channel to be transmitted; and a step of carrying out transmission by the pilot channel;

the mobile terminal carrying out:

a step of receiving the pilot channel from each of the radio base stations;

a step of calculating a difference between a reception field strength of the pilot channel of each of the radio base stations and the transmission power level information received;

a step of detecting from the difference a particular radio base station of a minimum propagation loss; and a step of originating a call to the particular radio base station of a minimum propagation loss thus detected.

According to this invention, there is provided a call control method in mobile communication in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations carries out:

a step of judging whether or not a downlink communication traffic is great or small;

a step of making the pilot channel to be transmitted store transmission power level information having a value greater than a pilot channel transmission power level actually transmitted in case where the communication traffic is small or making the pilot channel to be transmitted store the transmission power level information having a value smaller than the pilot channel transmission power level actually transmitted in case where the downlink communication traffic is great; and a step of carrying out transmission by the pilot channel;

the mobile terminal carrying out:

a step of receiving the pilot channel from each of the radio base stations;

a step of calculating a difference between a reception field strength of the pilot channel of each of the radio base stations and the transmission power level information received;

a step of detecting from the difference a particular radio base station of a minimum propagation loss; and a step of originating a call to the particular radio base station of a minimum propagation loss thus detected.

According to this invention, there is provided a call control method in mobile communication in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations carries out:

a step of storing pilot channel transmission power level information into the pilot channel to be transmitted; and a step of carrying out transmission by the pilot channel;

the mobile terminal carrying out:

a step of receiving the pilot channel from each of the radio base stations upon execution of soft handover when approaching its radio zone;

a step of calculating a difference between a reception field strength of the pilot channel and the transmission power level information; and a step of determining a particular radio base station for multiple access with reference to the difference.

According to this invention, there is provided a call control method in mobile communication in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations carries out:

a step of judging whether or not a downlink communication traffic is great or small;

a step of identifying the case where the downlink communication traffic exceeds a predetermined threshold level in the judging step;

a step of setting transmission power level information to a value greater than a transmission power level transmitted by the station in case where the threshold level is exceeded in the identifying step;

a step of storing the pilot channel transmission power level information into the pilot channel to be transmitted; and a step of transmitting the pilot channel;

the mobile terminal carrying out:

a step of receiving the pilot channel from each of the radio base stations upon execution of soft handover when approaching its radio zone;

a step of calculating a difference between a reception field strength of the pilot channel and the transmission power level information; and a step of determining a particular radio base station for multiple access with reference to the difference.

According to this invention, there is provided a call control method in mobile communication in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations carries out:

a step of judging whether or not a downlink communication traffic is great or small;

a step of making the pilot channel store first transmission power level information having a value greater and smaller than a pilot channel transmission power level actually transmitted in case where the downlink communication traffic is decreased and increased in the judging step, respectively;

a step of making the pilot channel store second transmission power level information having a value greater than the transmission power level transmitted by the station in case where the downlink communication traffic is increased to exceed a predetermined threshold level and a call setup request is received from the mobile terminal; and a step of transmitting the pilot channel;

the mobile terminal carrying out:

a step of receiving the pilot channel from each of the radio base stations;

a step of calculating a difference between the reception field strength of the pilot channel of each of the radio base stations and the first transmission power level information received;

a step of detecting from the difference a first particular radio base station of a minimum propagation loss;

a step of originating a call to the particular radio base station of a minimum propagation loss thus detected;

a step of calculating a difference between the reception field strength of the pilot channel and the second transmission power level information upon execution of soft handover; and a step of determining a second particular radio base station for multiple access with reference to the difference.

According to this invention, there is provided a mobile communication system in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations makes the pilot channel to be transmitted store pilot channel transmission power level information and transmits the pilot channel;

the mobile terminal receiving the pilot channel from each of the radio base stations, detecting a particular radio base station of a minimum propagation loss given by the difference between a reception field strength of the pilot channel and the transmission power level information received, and originating a call thereto.

Each of the radio base stations comprises:

storing means for storing the pilot channel transmission power level information into the pilot channel to be transmitted; and transmitting means for transmitting on the pilot channel the transmission power level information stored by the storing means;

the mobile terminal comprising:

receiving means for receiving the pilot channel from each of the radio base stations;

difference generating means for calculating a difference between the reception field strength of the pilot channel of each of the radio base stations that is received by the receiving means and the transmission power level information received;

detecting means for detecting a particular radio base station of a minimum propagation loss given by the difference calculated by the difference generating means; and call originating means for originating a call to the particular radio base station of a minimum propagation loss that is detected by the detecting means.

According to this invention, there is provided a mobile communication system in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations makes the pilot channel to be transmitted store transmission power level information having a value greater than a pilot channel transmission power level actually transmitted in case where a downlink communication traffic is small and transmits the pilot channel or makes the pilot channel to be transmitted store the transmission power level information having a value smaller than the pilot channel transmission power level actually transmitted in case where the downlink communication traffic is great and transmits the pilot channel;

the mobile station calculating a difference between a reception field strength of the pilot channel received from each of the radio base stations and the transmission power level information received, and originating a call to a particular base station of a minimum propagation loss detected from the difference.

Each of the radio base stations comprises:

judging means for judging whether the downlink communication traffic is great or small;

storing means for making the pilot channel to be transmitted store the transmission power level information having a value greater than the pilot channel transmission power level actually transmitted in case where the communication traffic is small in the judgement by the judging means or making the pilot channel to be transmitted store the transmission power level information having a value smaller than the pilot channel transmission power level actually transmitted in case where the downlink communication traffic is great; and transmitting means for transmitting on the pilot channel the transmission power level information stored by the storing means;

the mobile terminal comprising:

receiving means for receiving the pilot channel from each of the radio base stations;

difference generating means for calculating a difference between the reception field strength of the pilot channel of each of the radio base stations that is received by the receiving means and the transmission power level information received;

detecting means for detecting a particular radio base station of a minimum propagation loss given by the difference calculated by the difference generating means; and call originating means for originating a call to the particular base station of a minimum propagation loss that is detected by the detecting means.

According to this invention, there is provided a mobile communication system in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations makes the pilot channel to be transmitted store pilot channel transmission power level information and transmits the pilot channel;

the mobile terminal receiving the pilot channel from each of the radio base stations upon execution of soft handover when approaching its radio zone, and carrying out multiple access with reference to the difference between a reception field strength of the pilot channel and the transmission power level information.

Each of the radio base stations comprises:

storing means for storing the pilot channel transmission power level information into the pilot channel to be transmitted; and transmitting means for transmitting on the pilot channel the transmission power level information stored by the storing means;

the mobile terminal comprising:

receiving means for receiving the pilot channel from each of the radio base stations upon execution of soft handover when approaching its radio zone;

difference generating means for calculating a difference between a reception field strength of the pilot channel received by the receiving means and the transmission power level information; and determining means for determining a particular base station for multiple access with reference to the difference generated by the difference generating means.

According to this invention, there is provided a mobile communication system in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations makes the pilot channel to be transmitted store transmission power level information having a value greater than a transmission power level transmitted by the station in case where the downlink communication traffic exceeds a predetermined threshold level and transmits the pilot channel;

the mobile terminal carrying out multiple access with reference to the difference between the reception field strength of the pilot channel received from each of the radio base stations and the transmission power level information upon execution of soft handover when approaching its radio zone.

Each of the radio base stations comprises:

judging means for judging whether the downlink communication traffic is great or small;

identifying means for identifying the case where the downlink communication traffic exceeds a predetermined threshold level in the judgement by the judging means;

generating means for generating the transmission power level information having a value greater than the transmission power level transmitted by the station in case where the threshold level is exceeded in the identification by the identifying means;

storing means for making the pilot channel store the transmission power level information generated by the generating means; and transmitting means for transmitting on the pilot channel the transmission power level information stored by the storing means;

the mobile terminal comprising:

receiving means for receiving the pilot channel from each of the radio base stations upon execution of soft handover when approaching its radio zone;

difference generating means for calculating a difference between a reception field strength of the pilot channel received by the receiving means and the transmission power level information; and determining means for determining a particular base station for multiple access with reference to the difference generated by the difference generating means.

According to this invention, there is provided a mobile communication system in which communication is carried out through a radio channel between a mobile terminal and each of a plurality of radio base stations accommodated in a mobile communication control station and each radio base station at first carries out notification of information through a pilot channel to the mobile terminal moving into a radio zone thereof, wherein:

each of the radio base stations makes the pilot channel store first transmission power level information having a value greater and smaller than a pilot channel transmission power level being transmitted in case where the communication traffic is decreased and increased, respectively, and makes the pilot channel to be transmitted store second pilot channel transmission power level information having a value greater than the actual transmission power level transmitted by the station in case where the downlink communication traffic is increased to exceed a predetermined threshold level and a call setup request is received from the mobile terminal;

the mobile terminal originating a call to a first particular radio base station of a minimum propagation loss detected from a difference between a reception field strength of the pilot channel received from each of the radio base stations and the first transmission power level information received, and determining, upon execution of soft handover, a second particular radio base station for multiple access with reference to the difference between the reception field strength of the pilot channel and the second transmission power level information.

Each of the radio base stations comprises:

judging means for judging whether the downlink communication traffic is great or small;

first storing means for making the pilot channel store first transmission power level information having a value greater and smaller than the pilot channel transmission power level actually transmitted in case where the downlink communication traffic is decreased and increased in the judgement in the judging means, respectively;

second storing means for making the pilot channel to be transmitted store second pilot channel transmission power level information having a value greater than the actual transmission power level being transmitted by the station in case where the downlink communication traffic is increased to exceed a predetermined threshold level and a call setup request is received from the mobile terminal; and transmitting means for transmitting the pilot channel in which the first or the second transmission power level information is stored by the first or the second storing means;

the mobile terminal comprising:

receiving means for receiving the pilot channel from each of the radio base stations;

first difference generating means for calculating the difference between the reception field strength of the pilot channel of each of the radio base stations that is received by the receiving means and the first transmission power level information received;

detecting means for detecting the particular radio base station of a minimum propagation loss with reference to the difference calculated by the first difference generating means;

call originating means for originating a call to the particular radio base station of a minimum propagation loss that is detected by the detecting means;

second difference generating means for calculating, upon execution of soft handover, the difference between the reception field strength of the pilot channel and the second transmission power level information; and determining means for determining the particular radio base station for multiple access with reference to the difference generated by the first or the second difference generating means.

The mobile communication system employs a code division multiple access system.

In the call control method in mobile communication and the system therefor according to this invention, the mobile terminal selects the radio base station of a minimum propagation loss represented by the difference between the transmission power level information from the radio base station and the reception field strength upon actual reception of the pilot channel, and originates a call thereto. As a result, it is possible to start stable communication.

In the call control method in mobile communication and the system therefor according to this invention, each radio base station transmits the pilot channel with the transmission power level information having a greater (smaller) value stored therein in case where the downlink communication traffic as measured at the station is small (great). The mobile terminal selects the radio base station of a minimum propagation loss represented by the difference between the transmission power level information from the radio base station and the reception field strength upon actual reception of the pilot channel, and originates a call thereto.

As a result, a call origination allowable area (service area) can be fixed irrespective of the downlink communication traffic. In other words, it is possible to eliminate useless call control processing and to prevent enlargement of the radio zone in case where the downlink communication traffic at a particular radio base station becomes smaller than a reference traffic and the signal quality of the pilot channel is relatively improved.

It is also possible to prevent contraction of the radio zone in case where the downlink communication traffic becomes greater than the reference traffic at the particular radio base station and the signal quality of the pilot channel is relatively deteriorated.

In the call control method in mobile communication and the system therefor according to this invention, the mobile terminal selects the radio base station of a minimum propagation loss represented by the difference between the transmission power level information from the radio base station and the reception field strength upon actual reception of the pilot channel, and produces a multiple access request. As a result, the mobile terminal can produce the multiple access request in correspondence to the propagation loss.

In the call control method in mobile communication and the system therefor according to this invention, the mobile terminal selects the radio base station of a minimum propagation loss represented by the difference between the transmission power level information having a value greater than the transmission power level and the reception field strength upon actual reception of the pilot channel in case where the communication traffic of the radio base station measured at the radio base station is greater than the threshold level, and produces a multiple access request thereto.

As a result, the radio base station controls whether or not it will be included in multiple access destinations depending upon the communication traffic without causing useless call control processing. Thus, it is possible to control the communication traffic in the station.

In the call control method in mobile communication and the system therefor according to this invention, the pilot channel with the first transmission power level information having a greater (smaller) value stored therein is transmitted in case where the communication traffic at the radio base station is small (great). Furthermore, in case where the communication traffic of the station is greater than a specific value and the call setup request is received from the mobile terminal, the pilot channel with the second transmission power level information having a greater value stored therein is transmitted. The mobile terminal selects the radio base station of a minimum propagation loss represented by the difference between the first transmission power level information and the reception field strength upon actual reception of the pilot channel, and originates a call thereto. Furthermore, the mobile terminal selects the radio base station of a minimum propagation loss represented by the difference between the second transmission power level information and the reception field strength upon actual reception of the pilot channel, and produces a multiple access request thereto.

Specifically, the radio base station controls whether or not it is included in multiple access destinations depending upon the communication traffic while the call origination allowable area is fixed without depending upon the downlink communication traffic, and controls the communication traffic at the station to impart the communication capacity which has been used for multiple access to the mobile terminal producing the call setup request.

As a result, it is possible to eliminate useless call control processing and to prevent enlargement of the radio zone in case where the downlink communication traffic at a particular radio base station becomes smaller than a reference traffic and the signal quality of the pilot channel is relatively improved. It is also possible to prevent contraction of the radio zone in case where the downlink communication traffic becomes greater than the reference traffic at the particular radio base station and the signal quality of the pilot channel is relatively deteriorated.

Thus, the radio base station controls whether or not it acts as the multiple access destination depending upon the communication traffic at the station without causing useless call control processing. In case where the communication traffic exceeds the threshold level and the call setup request is produced, the possibility of acting as the multiple access destination is decreased to assure the communication capacity for the requested call and to reduce the call loss ratio.

BRIEF DESCRIPTION OF THE DRAWINGS

FIG. 4 is a view for describing the content of information transmitted on a pilot channel in the first embodiment;

FIG. 17 is a view for describing information transmitted on a pilot channel in the fifth embodiment.

DESCRIPTION OF THE PREFERRED EMBODIMENTS

Figure 1:
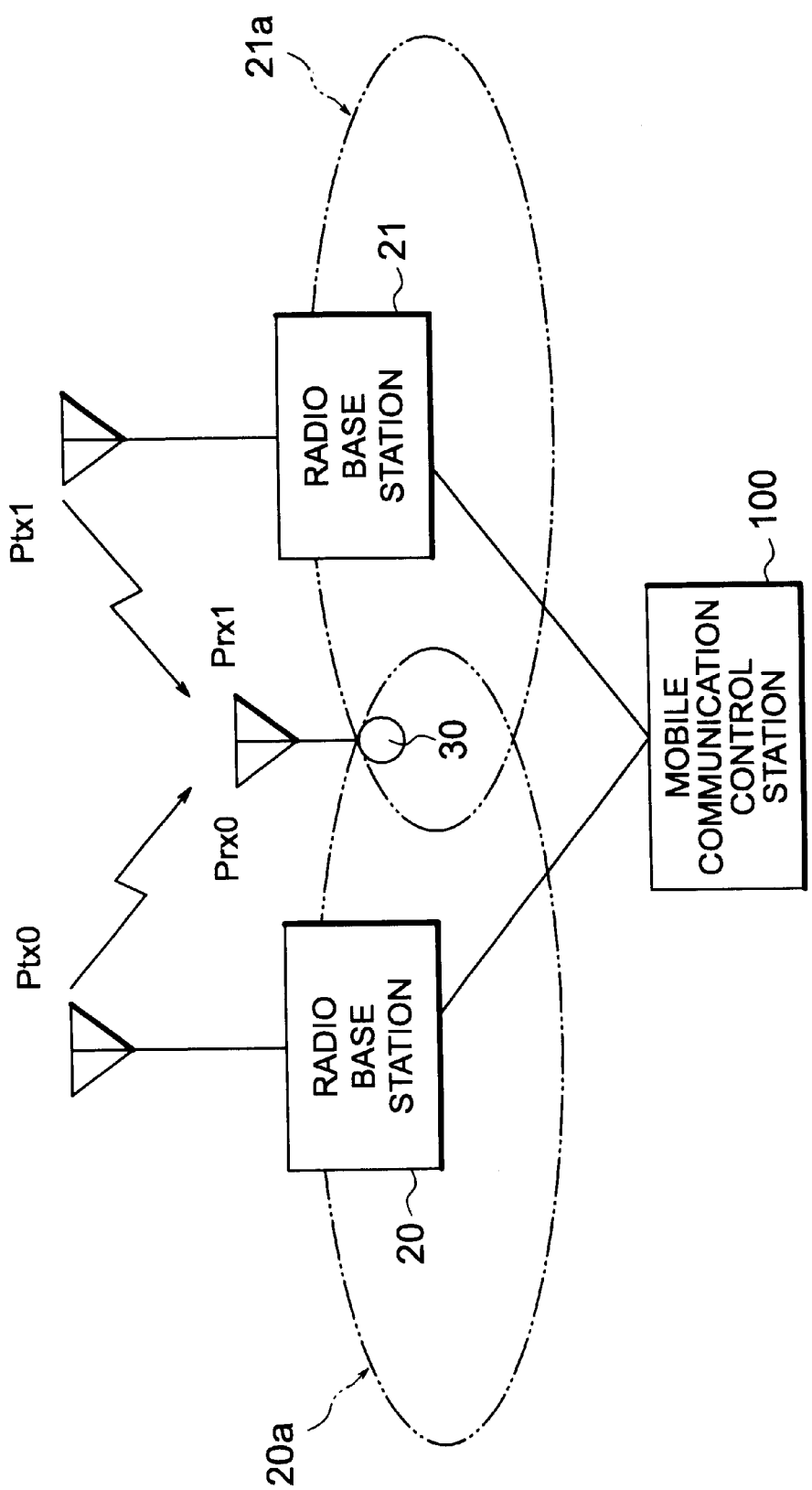
FIG. 1 is a view for describing a call control method in mobile communication and a system therefor according to a first embodiment of this invention.

Now, description will be made in detail as regards a call control method in mobile communication and a system therefor according to this invention with reference to the drawing.

Referring to FIG. 1, a mobile communication system illustrated herein is based on a CDMA system and comprises radio base stations (cell base stations) 20 and 21 controlled by a mobile communication control station 100 in a mobile communication network, and a mobile terminal 30 located in a boundary region where radio zones (service areas) 20a and 21a of the radio base stations 20 and 21 overlap each other.

Figure 2:
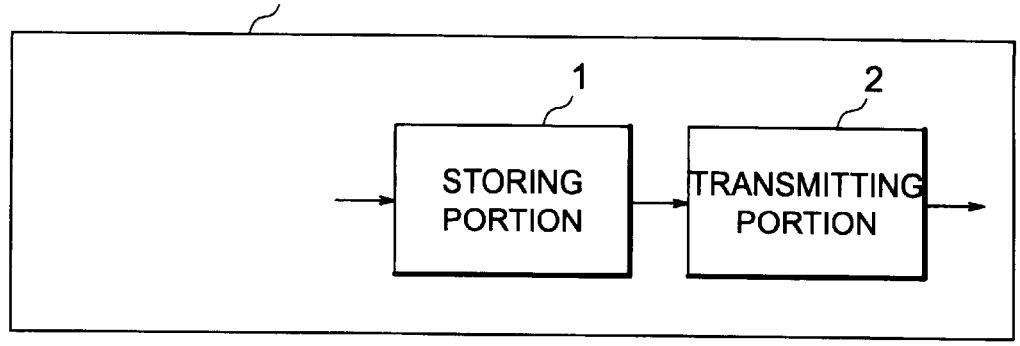
FIG. 2 is a block diagram of a radio base station in the first embodiment.

Referring to FIG. 2, each of the radio base stations 20 and 21 comprises a radio communication portion including a storing portion 1 for storing pilot channel transmission power level information to be transmitted on a pilot channel, and a transmitting portion 2 for transmitting the transmission power level information on the pilot channel.

Figure 3:
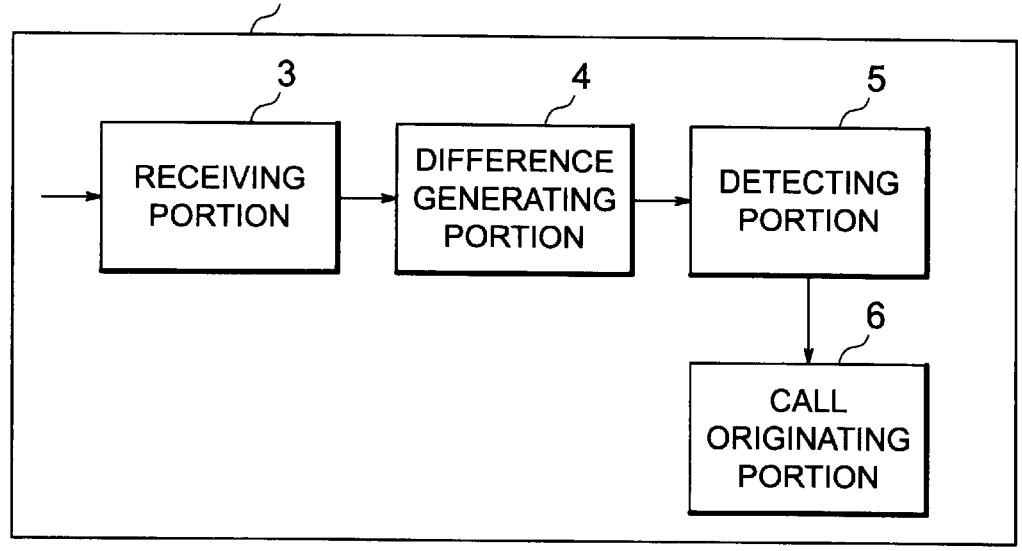
FIG. 3 is a block diagram of a mobile terminal in the first embodiment.

Referring to FIG. 3, the mobile terminal 30 comprises a radio communication portion including a receiving portion 3 for receiving signals transmitted on the pilot channels from the radio base stations 20 and 21, a difference generating portion 4 for calculating a difference between a reception field strength of the pilot channel received from each of the radio base stations 20 and 21 and the transmission power level information received, a detecting portion 5 for detecting from the difference one of the radio base stations 20 and 21 which has a minimum propagation loss, and a call originating portion 6 for originating a call to the detected one of the radio base stations 20 and 21 which has a minimum propagation loss.

The mobile terminal 30 is located in the boundary region where the radio zones (service areas) 20a and 21a overlap each other and receives signals on the pilot channels from both of the radio base stations 20 and 21. Upon origination of a call, the mobile terminal 30 calculates a value of a propagation loss (Ptx0–Prx0) for the radio base station 20 as a difference between the transmission power level information (transmission power level information) Ptx0 obtained from the pilot channel as transmitted from the radio base station 20 and the reception field strength Prx0 actually received. Similarly, the mobile terminal 30 calculates a value of a propagation loss (Ptx1–Prx1) for the radio base station 21 as a difference between the transmission power level information Ptx1 obtained from the pilot channel as transmitted from the radio base station 21 and the reception field strength Prx1 actually received. Then, the mobile terminal 30 compares the propagation losses thus calculated for the radio base stations 20 and 21. To one of the radio base stations 20 and 21 which has the propagation loss of a smaller value, the call is originated.

Referring to FIG. 4, the information transmitted as signals on the pilot channel comprises a radio base station identifier indicative of an individual one of the radio base stations which transmits on the pilot channel, an available channel identifier as an identifier of a radio channel which is available at the radio base station 20 or 21, the transmission power level information representative of the transmission power level of the pilot channel, and radio base station information related to the radio base station 20 or 21.

Herein, the mobile communication system is a CDMA system. By preliminarily preparing spread codes in one-toone correspondence to the transmission power level information, it is possible to transmit the transmission power level information to the mobile terminal 30.

Next, the operation of the first embodiment will be described.

Figure 5:
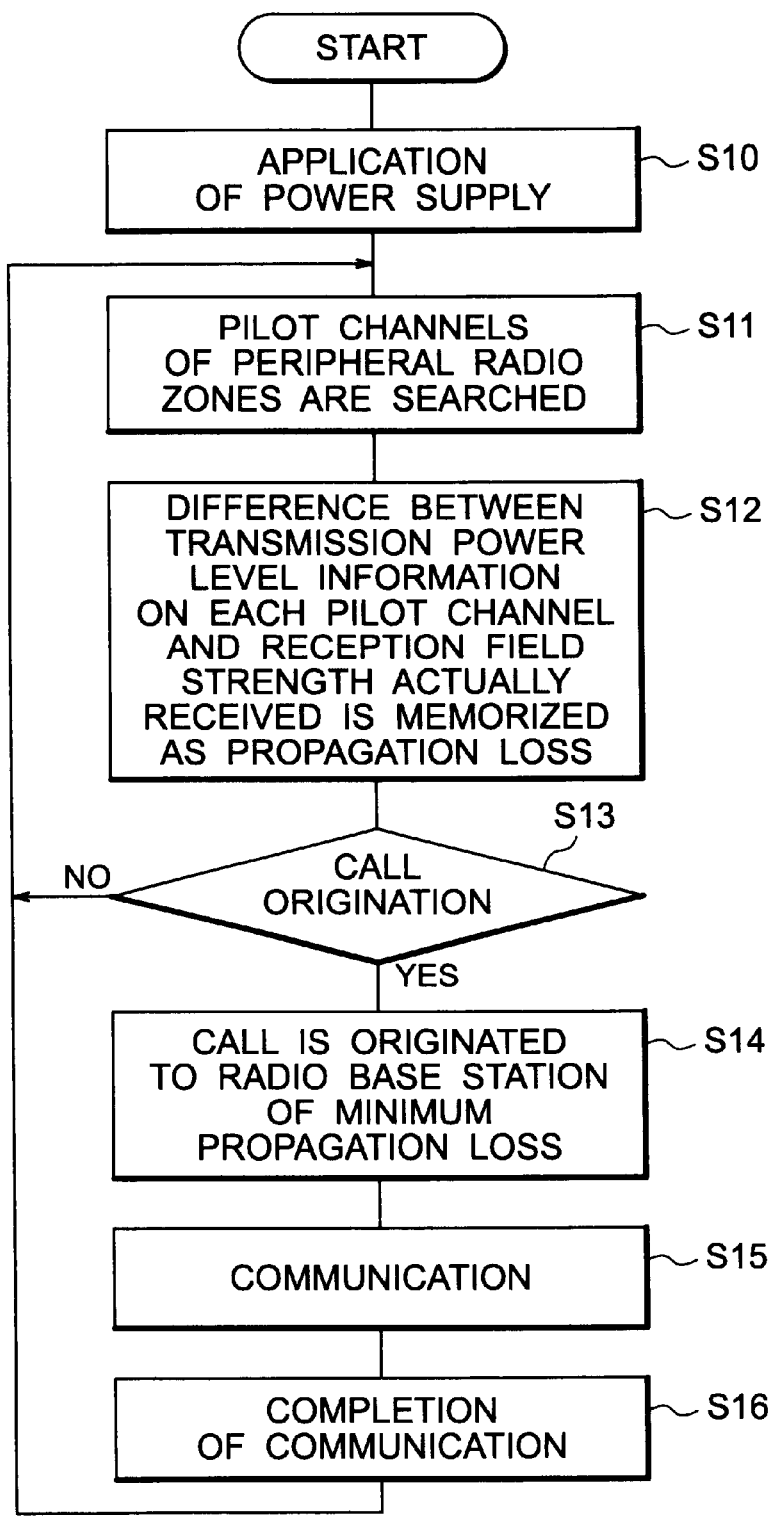
FIG. 5 is a flow chart showing a sequence of steps of operation of the first embodiment.

Referring to FIG. 5 in addition to FIGS. 1–4, the mobile terminal 30 searches the pilot channels of peripheral (or surrounding) radio zones after application of a power supply at the start of operation or after a resetting operation (steps S10, S11). The mobile terminal 30 makes a memory (not shown) store propagation losses given by the differences (Ptx0–Prx0, Ptx1–Prx1) between the transmission power level information Ptx0 and Ptx1 transmitted on the pilot channels from the radio base stations 20 and 21 and the reception field intensities Prx0 and Prx1 actually received (step S12).

In case where no call is originated (No in step S13), the steps S11 and S12 are repeated. In case where the mobile terminal 30 originates a call (Yes in step S13), the call is originated to one of the radio base stations 20 and 21 which has a minimum propagation loss in the propagation losses stored as mentioned above (step S14) and communication is carried out (step S15). After completion of the communication (step S16), the operation returns to the step S11 to again search the pilot channels of the peripheral radio zones.

Thus, in the first embodiment, the mobile terminal 30 selects one of the radio base stations 20 and 21 which has a minimum propagation loss given by the difference between the transmission power level information and the reception field strength upon actual reception of the pilot channel, and originates the call thereto. As a result, stable communication can be started.

Figure 6:
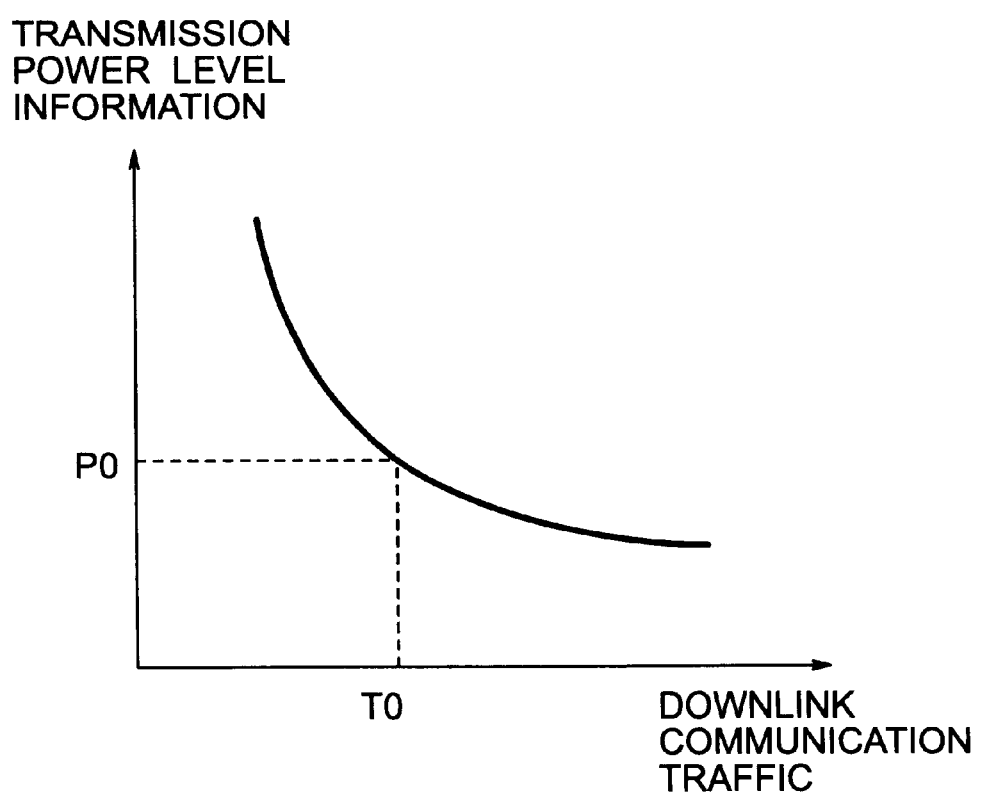
FIG. 6 is a view for describing the relationship between a downlink communication traffic and transmission power level information in a second embodiment.

Referring to FIG. 6, description will be made of a second embodiment.

Figure 7:
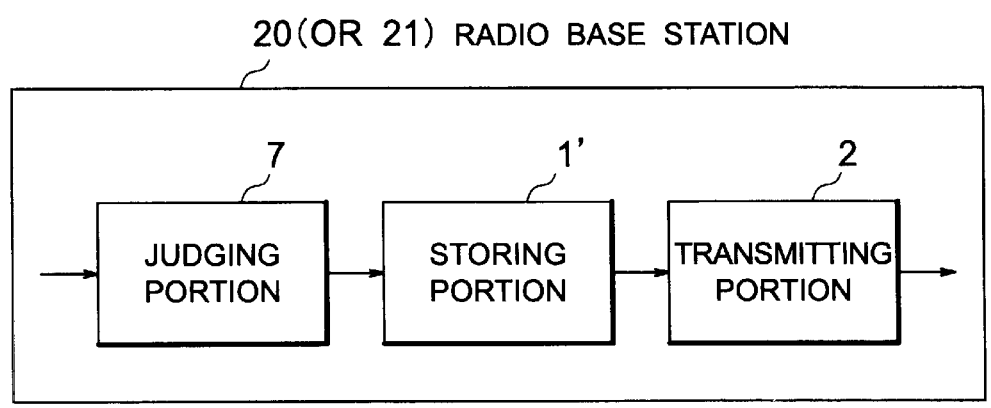
FIG. 7 is a block diagram of a radio base station in the second embodiment.

The second embodiment is similar in structure to the first embodiment illustrated in FIG. 1. Referring to FIG. 7, each of the radio base stations 20 and 21 in the second embodiment comprises a judging portion 7 for judging whether a downlink communication traffic is great or small, a storing portion 1' for making, in case where the judging portion 7 judges that the communication traffic is small, a storing of the transmission power level information having a value greater than a pilot channel transmission power level actually transmitted or for making, in case where the downlink communication traffic is great, a storing of the transmission power level information having a value smaller than the pilot channel transmission power level actually transmitted, and a transmitting portion 2 for transmitting on the pilot channel the transmission power level information stored as mentioned above.

On the other hand, the mobile terminal 30 comprises, as shown in FIG. 3, the receiving portion 3 for receiving signals on the pilot channels from the radio base stations 20 and 21, the difference generating portion 4 for calculating the difference between the reception field strength of the pilot channel received from each of the radio base stations 20 and 21 and the transmission power level information received, the detecting portion 5 for detecting from the difference one of the radio base stations 20 and 21 which has a minimum propagation loss, and the call originating portion 6 for originating a call to the detected one of the radio base stations 20 and 21 which has a minimum propagation loss.

Next, the operation of the second embodiment will be described.

Referring to FIG. 6 in addition to FIG. 1, T0 represents a reference value of the downlink communication traffic while P0 represents the pilot channel transmission power level actually transmitted. Each of the radio base stations 20 and 21 continuously monitors the downlink communication traffic of the station itself. In case where the downlink traffic is increased in the above-mentioned monitoring as illustrated in FIG. 6, the transmission power level information Ptx0 or Ptx1 stored as information to be sent on the pilot channel transmitted from the radio base station 20 or 21 is given a value smaller than the power level actually transmitted. On the other hand, in case where the downlink traffic is decreased, the transmission power level information Ptx0 or Ptx1 stored as information to be sent on the pilot channel transmitted from the radio base station 20 or 21 is given a value greater than the power level actually transmitted.

Thus, in the second embodiment, the call origination allowable area can be fixed irrespective of the downlink communication traffic. In other words, it is possible to eliminate useless call control processing and to prevent enlargement of the radio zone in case where the downlink communication traffic at the radio base station 20 or 21 becomes smaller than the reference traffic and the signal quality of the pilot channel is relatively improved. It is also possible to prevent contraction of the radio zone in case where the downlink communication traffic becomes greater than the reference traffic at the radio base station 20 or 21 and the signal quality of the pilot channel is relatively deteriorated.

Figure 8:
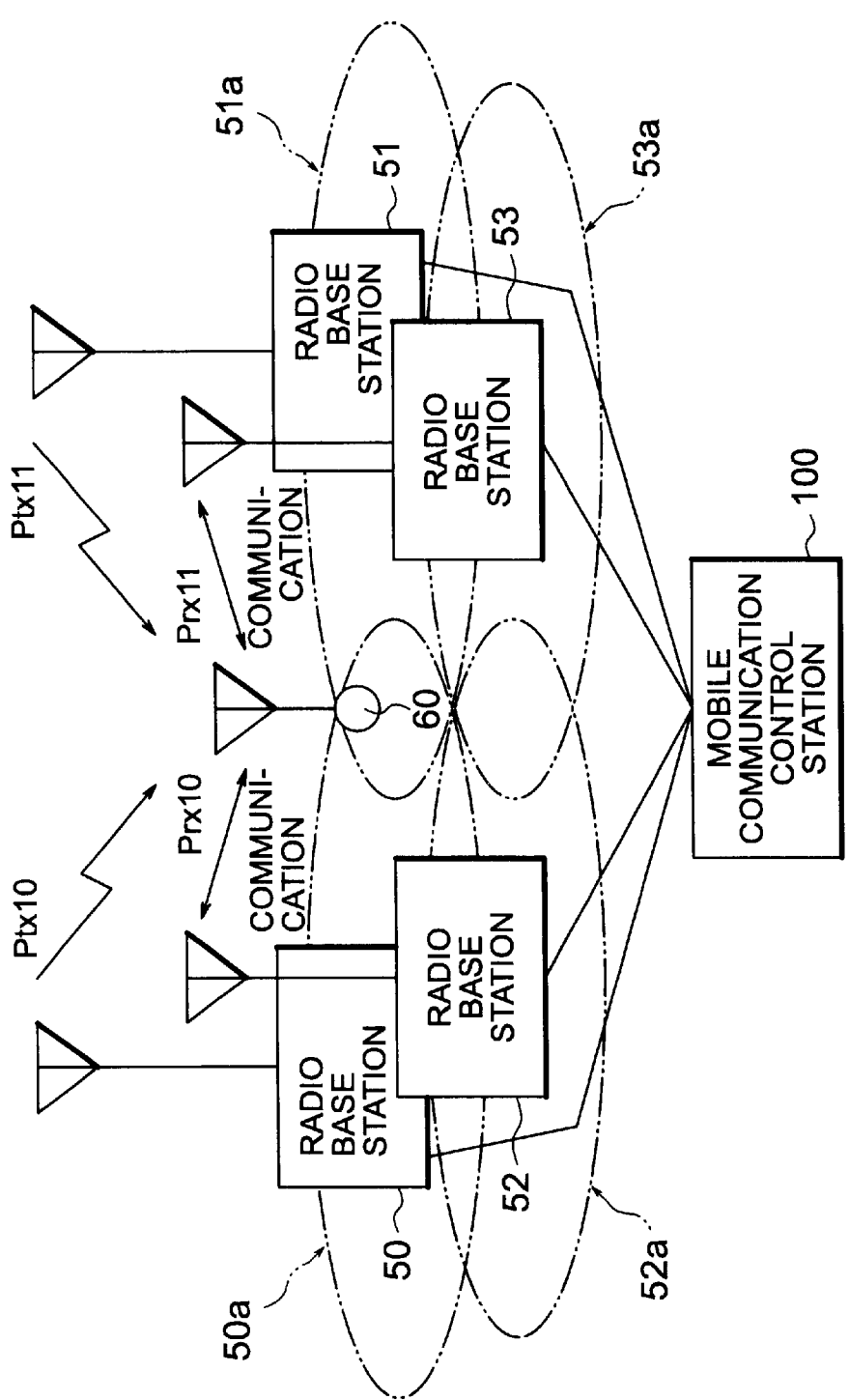
FIG. 8 is a block diagram showing a mobile communication system according to a third embodiment.

Referring to FIG. 8, a mobile communication system according to a third embodiment comprises radio base stations 50, 51, 52, and 53 arranged adjacent to one another and accommodated in a mobile communication control station 100. The radio base stations 50 and 51 have radio zones (service areas) 50a and 51a with a boundary region where the service areas overlap each other. The radio base stations 52 and 53 have radio zones (service areas) 52a and 53a with a boundary region where the service areas overlap each other. A mobile terminal 60 is located in the boundary region where the radio zones 50a and 51a overlap each other.

Figure 9:
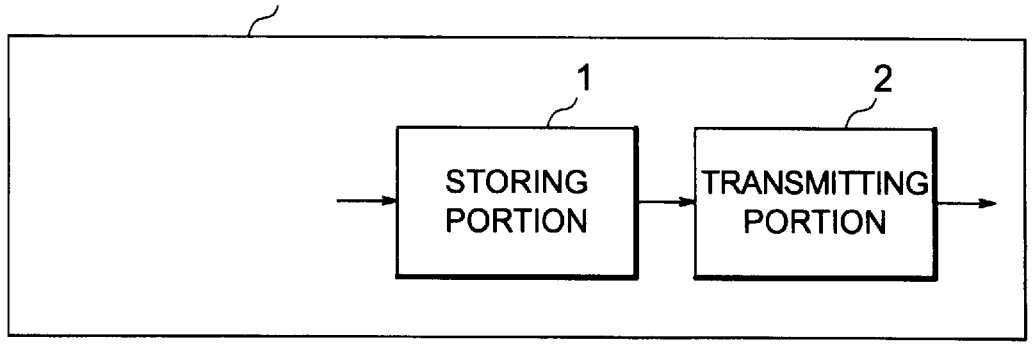
FIG. 9 is a block diagram of a radio base station in the third embodiment.

Referring to FIG. 9, each of the radio base stations 50 through 53 has a storing portion 1 for storing pilot channel transmission power level information to be transmitted on a pilot channel, and a transmitting portion 2 for transmitting on the pilot channel the transmission power level information stored as mentioned above.

Figure 10:
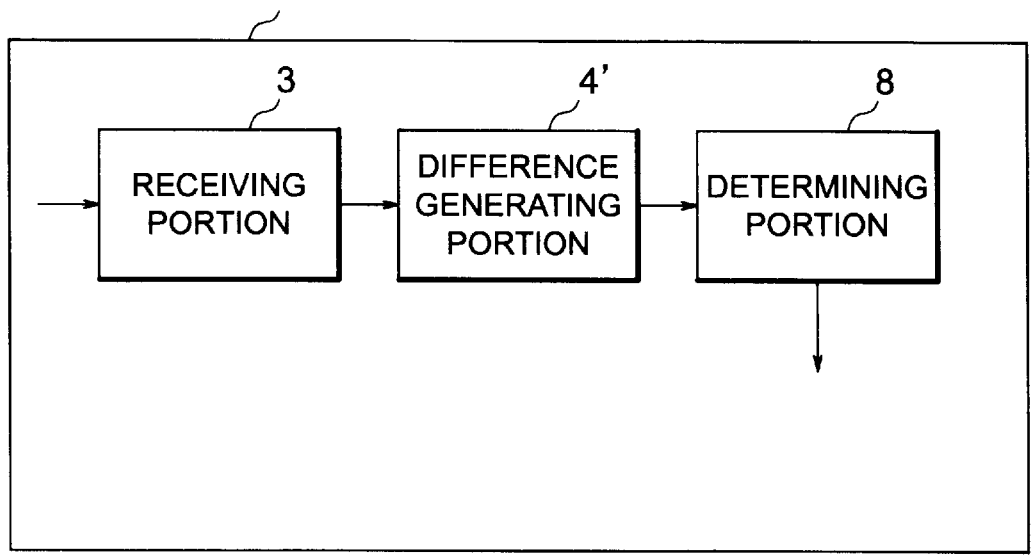
FIG. 10 is a block diagram of a mobile terminal in the third embodiment.

Referring to FIG. 10, the mobile terminal 60 comprises a receiving portion 3 for receiving signals on the pilot channel from each of the radio base stations 50 through 53 upon execution of soft handover when approaching the radio zone thereof, a difference generating portion 4' for calculating the difference between the reception field strength and the transmission power level information of each pilot channel thus received, and a determining portion 8 for determining with reference to the difference thus calculated one of the radio base stations 50 through 53 for multiple access.

Next, the operation of the third embodiment of FIG. 8 will be described.

The mobile terminal 60 is located in the boundary region between the radio zone 50a and the radio zone 51a, receives signals on the pilot channels transmitted from the radio base stations 50 and 51, and carries out multiple access. Upon carrying out new multiple access, the mobile terminal 60 calculates the value of the propagation loss (Ptx10−Prx10) given by the difference between the transmission power level information Ptx10 transmitted on the pilot channel from the radio base station 50 and the reception field strength Prx10 actually received. Likewise, the mobile terminal 60 calculates the value of the propagation loss given by the difference (Ptx11−Prx11) between the transmission power level information Ptx11 transmitted on the pilot channel from the radio base station 51 and the reception field strength Prx11 actually received. There values are stored as a peripheral radio zone set. When the new multiple access is required, the mobile terminal 60 selects an appropriate one of the radio base stations 50 through 53 from the peripheral radio zone set and sends an access request (or a connection request) by soft handover to the selected one of the radio base stations 50 through 53.

Figure 11:
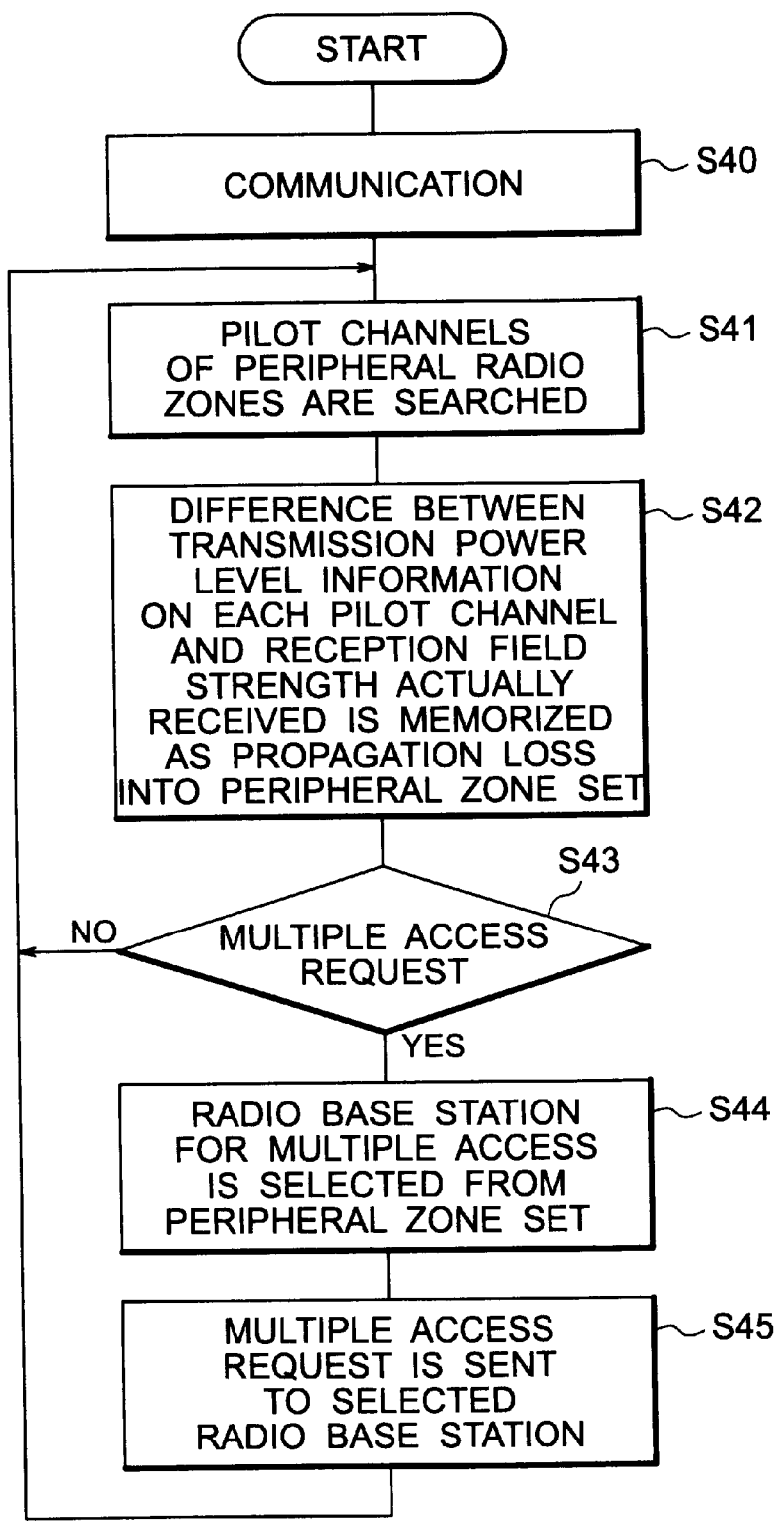
FIG. 11 is a flow chart showing a sequence of steps of operation of soft handover in the third embodiment.

Referring to FIG. 11, description will be made the operation of soft handover in the third embodiment of FIG. 8.

During communication (step S40), the mobile terminal 60 searches the pilot channels of the peripheral radio zones 50a through 53a (step S41). The propagation loss given by the difference between the transmission power level information transmitted in each pilot channel and the reception field strength actually received is stored in the peripheral radio zone set (step S42). In case where the mobile terminal 60 does not produce a new multiple access request (No in step S43), the above-mentioned steps are repeated. In case where the mobile terminal 60 produces a new multiple access request (Yes in step S43), one of the radio base stations 50 through 53 is selected for the new multiple access with reference to the propagation losses in the peripheral radio zone set memorized as mentioned above (step S44). The access request is sent to the selected one of the radio base stations 50 through 53 (step S45). Next, the pilot channels of the peripheral radio zones are searched again.

Thus, in the third embodiment, the pilot channel is transmitted from each of the radio base stations 50 through 53 with the pilot channel transmission power level information transmitted on the pilot channel. The mobile terminal 60 recognizes as the propagation loss the difference between the transmission power level information and the reception field strength upon actual reception of the pilot channel, selects one of the radio base stations 50 through 53 which has a minimum propagation loss, and sends a multiple access request thereto. As a result, the mobile terminal 60 can produce the multiple access request in correspondence to the propagation loss.

Figure 12:
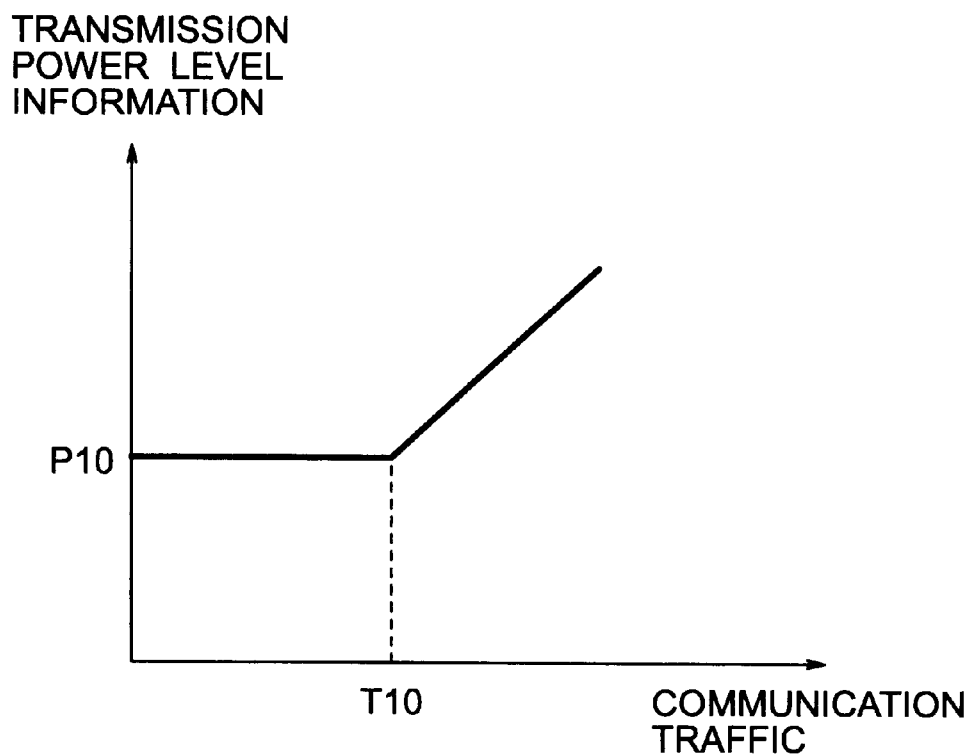
FIG. 12 is a view for describing the relationship between a communication traffic and transmission power level information in a fourth embodiment.

Referring to FIG. 12, description will be made about a fourth embodiment.

The fourth embodiment is similar in structure to the third embodiment of FIG. 8.

Figure 13:
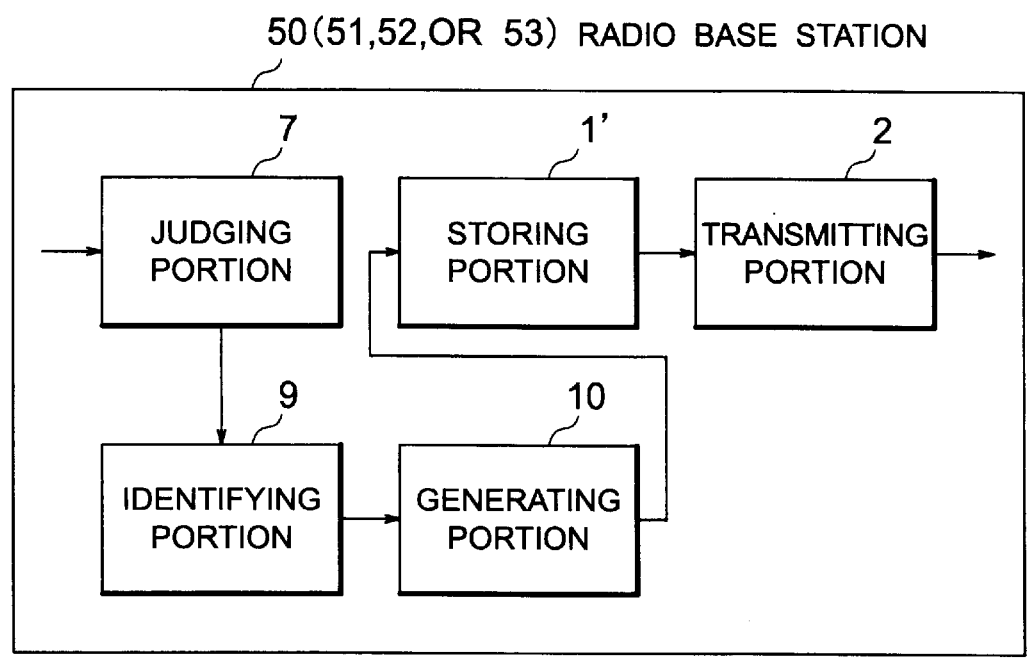
FIG. 13 is a block diagram of a radio base station in the fourth embodiment.

Referring to FIG. 13, each of the radio base stations 50 through 53 comprises a judging portion 7 for judging whether the downlink communication traffic is great or small, an identifying portion 9 for identifying the case where the judging portion 7 judges that the downlink communication traffic exceeds a predetermined threshold level, a generating portion 10 for generating the transmission power level information having a value greater than the actual transmission power level transmitted from the station itself in case where the identifying portion 9 identifies that the threshold level is exceeded, a storing portion 1' for storing the pilot channel transmission power level information thus generated, and a transmitting portion 2 for transmitting on the pilot channel the transmission power level information thus stored, although not illustrated in the figure.

The mobile terminal 60 comprises, as shown in FIG. 10, a receiving portion 3 for receiving signals on the pilot channel from each of the radio base stations 50 through 53 upon execution of soft handover when approaching the radio zone thereof, a difference generating portion 4' for calculating a difference between the reception field strength of each pilot channel actually received and the transmission power level information, and a determining portion 8 for determining one of the radio base stations 50 through 53 for multiple access with reference to the difference thus calculated.

Referring to FIG. 12 in addition to FIG. 8, T10 represents a reference value of the downlink communication traffic while P10 represents the pilot channel transmission power level actually transmitted. Each of the radio base stations 50 through 53 continuously monitors the communication traffic of the station itself. In case where the traffic becomes greater than T10 in this monitoring as illustrated in FIG. 12, the transmission power level information transmitted on the pilot channel from the station itself is given a value greater than the power level actually transmitted.

Thus, in the fourth embodiment, each of the radio base stations 50 through 53 transmits the transmission power level information on the pilot channel having a greater value stored therein in case where the monitored communication traffic of the station is greater than the threshold level. The mobile terminal 60 selects one of the radio base stations 50 through 53 having a minimum propagation loss given by the difference between the transmission power level information and the reception field strength upon actual reception of the pilot channel and produces a multiple access request thereto.

As a result, each of the radio base stations 50 through 53 controls whether or not it is included in multiple access destinations depending upon the communication traffic without causing useless call control processing. Thus, it is possible to control the communication traffic at the station itself.

Figure 15:
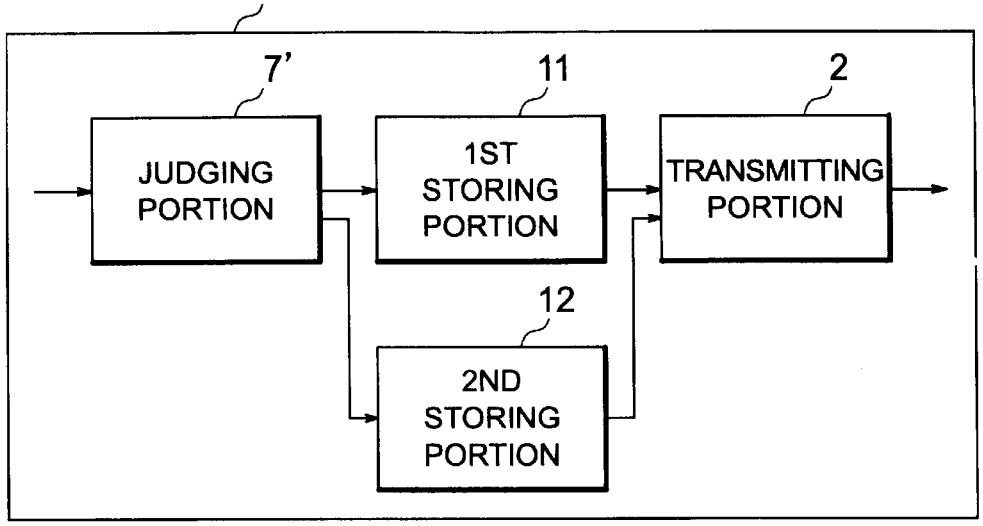
FIG. 15 is a block diagram of a radio base station in the fifth embodiment.

Referring to FIG. 15, each of the radio base stations 70 and 71 comprises a judging portion 7' for judging whether a downlink communication traffic is great or small, a first storing portion 11 for making, in case where the judging portion judges that the downlink communication traffic is decreased and increased, a first transmission power level information be stored having a value greater and smaller than a pilot channel transmission power level actually transmitted, respectively, a second storing portion 12 for making, in case where the downlink communication traffic is increased to exceed a predetermined threshold level and a call setup request from the mobile terminal 81 is received, the second transmission power level information be stored having a value greater than the transmission power level actually transmitted from the station, and a transmitting portion 2 for transmitting the first or the second transmission power level information on the pilot channel, although not illustrated in the figure.

Figure 16:
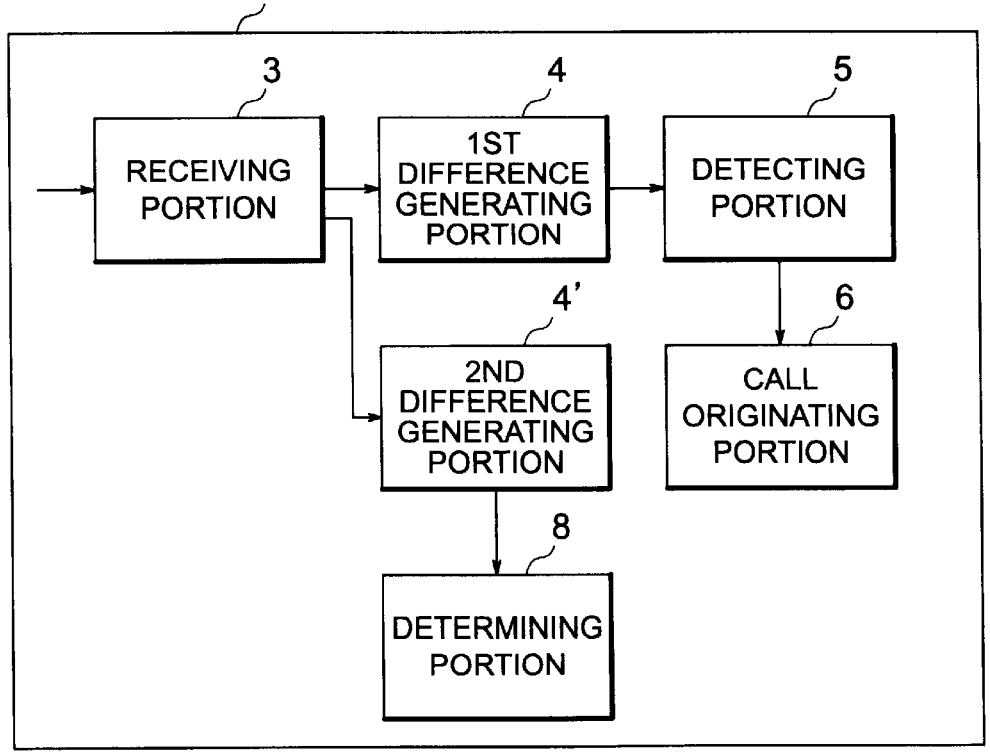
FIG. 16 is a block diagram of a mobile terminal in the fifth embodiment.

Referring to FIG. 16, the mobile terminal 81 comprises a receiving portion 3 for receiving signals on the pilot channels from the radio base stations 70 and 71, a first difference generating portion 4 for calculating a difference between the reception field strength and the received first transmission power level information for each of the pilot channels received from the radio base stations 70 and 71, a detecting portion 5 for detecting from the difference one of the radio base stations 70 and 71 which has a minimum propagation loss, a call originating portion 6 for originating a call to the detected one of the radio base stations 70 and 71 which has a minimum propagation loss, a second difference generating portion 4' for calculating a difference between the reception field strength and the second transmission power level information sent on the pilot channel upon execution of soft handover, and a determining portion 8 for determining one of the radio base stations 70 and 71 for multiple access with reference to the difference.

Next, the operation of the fifth embodiment of FIG. 14 will be described.

The mobile terminal 80 is located in the boundary region between the radio zones 70a and 71a and receives the pilot channels from the radio base stations 70 and 71 to carry out multiple access. Upon originating a new call from the mobile terminal 81 to the radio base station 70 and if the communication traffic at the radio base station 70 exceeds a particular threshold level, the radio base station 70 transmits the second transmission power level information for multiple access with a greater value given thereto, and carries out call setup control processing to the mobile terminal 81. If the second transmission power level information for multiple access has a greater value, the propagation loss with respect to the radio base station 70 is increased at the mobile terminal 80 carrying out multiple access. Therefore, the radio base station 70 is eliminated from the multiple access destinations at the mobile terminal 80 and the communication capacity is given to the mobile terminal 81 which has produced a call setup request.

Figure 14:
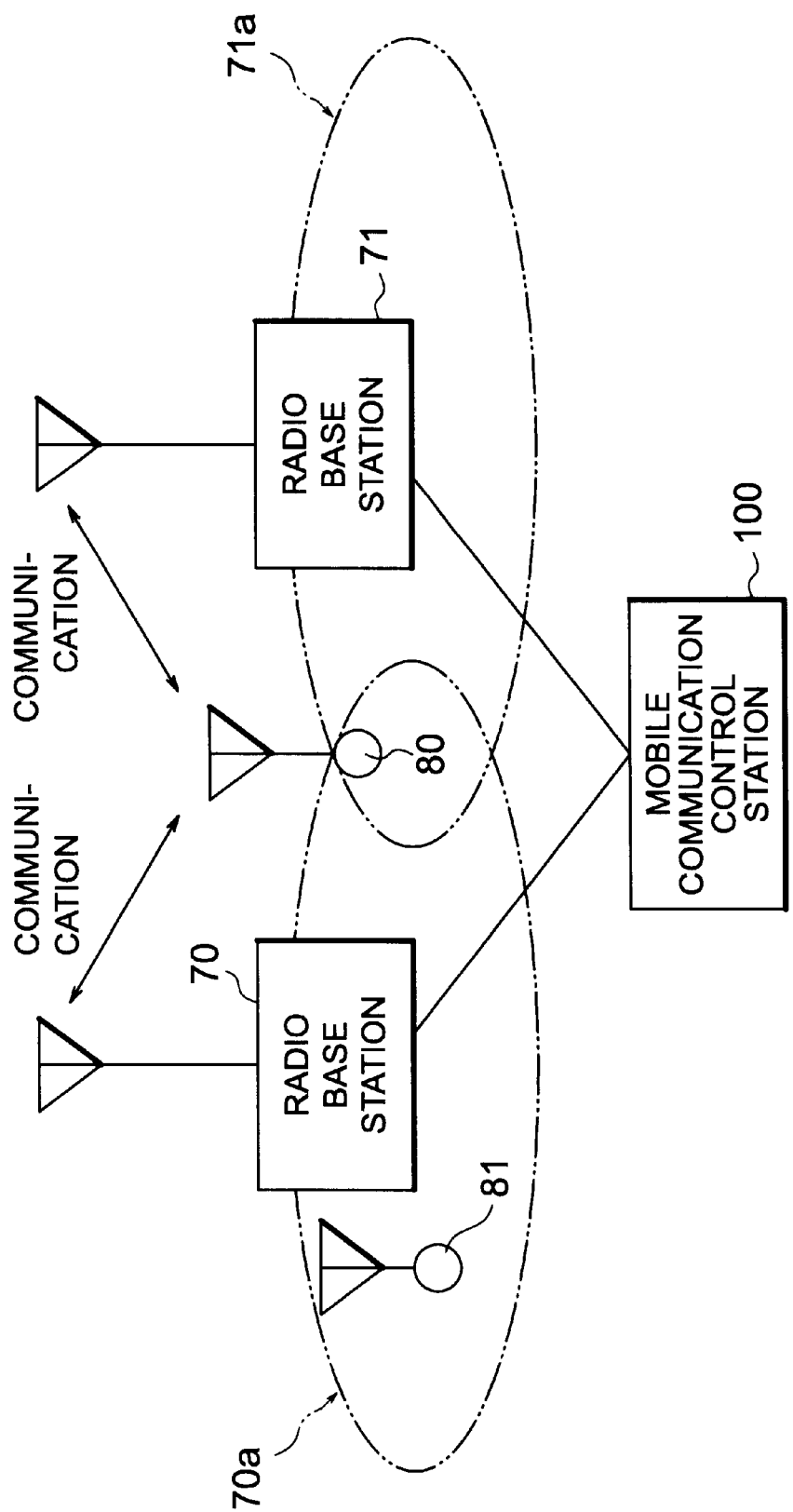
FIG. 14 is a block diagram showing a mobile communication system according to a fifth embodiment.

Referring to FIG. 17, the information on the pilot channel in the fifth embodiment of FIG. 14 includes a radio base station identifier indicative of the radio base station 70 or 71 transmitting the pilot channel, an available channel identifier as an identifier of a radio channel available at the radio base station 70 or 71, transmission power level information representative of a first pilot channel transmission power level for use in call setup control, transmission power level information representative of a second pilot channel transmission power level for use in the multiple access request, and radio base station information related to the radio base station 70 or 71. Herein, the mobile communication system is a CDMA system. By preliminarily preparing spread codes in one-to-one correspondence to the transmission power level information, it is possible to transmit the transmission power level information to the mobile terminal 80.

Thus, in the fifth embodiment, it is possible to eliminate useless call control processing and to prevent enlargement of the radio zone in case where the downlink communication traffic at the radio base station 70 or 71 becomes smaller than the reference traffic and the signal quality of the pilot channel is relatively improved. It is also possible to prevent contraction of the radio zone in case where the downlink communication traffic becomes greater than the reference traffic at the radio base station 70 or 71 and the signal quality of the pilot channel is relatively deteriorated.

Thus, the radio base station 70 or 71 controls whether or not it acts as a multiple access destination depending upon the communication traffic at the station itself without causing useless call control processing. In case where the call setup request is produced when the communication traffic exceeds the threshold level, the possibility of acting as the multiple access destination is decreased to assure the communication capacity for the requested call and to reduce the call loss ratio.

In the foregoing embodiments, description has been directed to the CDMA system. However, this invention is also applicable to other communication systems, for example, the TDMA system (PDC/Personal Digital Cellular Telecommunication System), TDMA/TDD system (Digital Cordless Telephone System (PHS/Personal Handyphone System), and DECT (Digital European Cordless Telecommunication/CT-2). In this event, consideration must be made about the fact that, in the TDMA system, the control channel and the communication (information) channel are different in frequency of a slot, in contrast to the CDMA system using a single frequency.

As is obvious from the foregoing, in the call control method in mobile communication and the system therefor according to this invention, the mobile terminal selects one of the radio base stations which has a minimum propagation loss represented by the difference between the transmission power level information supplied thereto and the reception field strength upon actual reception of the pilot channel, and originates a call thereto. As a result, stable communication can be started.

In the call control method in mobile communication and the system therefor according to this invention, the radio base station transmits the transmission power level information on the pilot channel having a greater (smaller) value stored therein in case where the monitored downlink communication traffic at the station is small (great). The mobile terminal selects one of the radio base stations which has a minimum propagation loss represented by the difference between the transmission power level information supplied from the radio base station and the reception field strength upon actual reception of the transmission power level information on the pilot channel, and originates a call thereto. As a result, irrespective of the downlink communication traffic, a call origination allowable area (service area) can be fixed.

Furthermore, in the call control method in mobile communication and the system therefor according to this invention, the mobile terminal selects one of the radio base stations which has a minimum propagation loss represented by the difference between the transmission power level information supplied from the radio base station and the reception field strength upon actual reception of the pilot channel, and produces a multiple access request thereto. As a result, the mobile terminal can produce the multiple access request in correspondence to the propagation loss.

In the call control method in mobile communication and the system therefor according to this invention, the mobile terminal selects one of the radio base stations which has a minimum propagation loss represented by the difference between the transmission power level information having a greater value and the reception field strength upon actual reception of the pilot channel in case where the communication traffic of the radio base station monitored there at is greater than the threshold level, and produces a multiple access request thereto.

As a result, the radio base station controls whether or not it is included in the multiple access destinations depending upon the communication traffic without causing useless call control processing. Thus, it is possible to control the communication traffic at the station itself.

Furthermore, in the call control method in mobile communication and the system therefor according to this invention, the first transmission power level information having a greater (smaller) value is transmitted on the pilot channel in case where the communication traffic at the radio base station is small (great). In case where the communication traffic at the station is greater than a specific value and a call setup request is received from the mobile terminal, the second transmission power level information having a greater value is transmitted on the pilot channel. The mobile terminal selects one of the radio base stations which has a minimum propagation loss represented by the difference between the first transmission power level information and the reception field strength upon actual reception of the transmission power level information on the pilot channel, and originates a call thereto. The mobile terminal also selects one of the radio base stations which has a minimum propagation loss represented by the difference between the second transmission power level information and the reception field strength upon actual reception of the transmission power level information on the pilot channel, and produces a multiple access request thereto.

As a result, it is possible to eliminate useless call control processing and to prevent enlargement of the radio zone in case where the downlink communication traffic at a particular radio base station is smaller than the reference traffic and the signal quality of the pilot channel is relatively improved. It is also possible to prevent contraction of the radio zone in case where the downlink communication traffic becomes greater than the reference traffic at the radio base station and the signal quality of the pilot channel is relatively deteriorated. Therefore, in case where the call setup request is produced when the communication traffic exceeds the threshold level, the possibility of acting as the multiple access destination is suppressed to assure the communication capacity for the requested call and to decrease the call loss ratio.

What is claimed is:

1. A call control method in mobile communication in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations carries out:
 a step of judging whether or not a downlink communication traffic is great or small;
 a step of storing transmission power level information having a value greater than a pilot channel transmission power level actually transmitted in case where the communication traffic is small, or storing the transmission power level information having a value smaller than the pilot channel transmission power level actually transmitted in case where the downlink communication traffic is great; and
 a step of carrying out transmission of said transmission power level information on said pilot channel;

said mobile terminal carrying out:
 a step of receiving said pilot channel from each of said radio base stations;
 a step of calculating a difference between a reception field strength of said pilot channel of each of said radio base stations and the transmission power level information received;

a step of detecting from the difference a particular radio base station of a minimum propagation loss; and a step of originating a call to said particular radio base station of a minimum propagation loss thus detected.

2. A call control method in mobile communication in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations carries out:
- a step of judging whether or not a downlink communication traffic is great or small;
- a step of identifying the case where the downlink communication traffic exceeds a predetermined threshold level in said judging step;
- a step of setting transmission power level information to a value greater than a transmission power level transmitted by said station in case where the threshold level is exceeded in said identifying step;
- a step of storing the pilot channel transmission power level information to be transmitted on said pilot channel; and
- a step of transmitting said pilot channel transmission power level information on pilot channel;

said mobile terminal carrying out:
- a step of receiving said pilot channel from each of said radio base stations upon execution of soft handover when approaching its radio zone;
- a step of calculating a difference between a reception field strength of said pilot channel and the transmission power level information; and
- a step of determining a particular radio base station for multiple access with reference to the difference.

3. A call control method in mobile communication in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations carries out:
- a step of judging whether or not a downlink communication traffic is great or small;
- a step of storing first transmission power level information having a value greater and smaller than a pilot channel transmission power level actually transmitted in case where the downlink communication traffic is decreased and increased in said judging step, respectively;
- a step of storing second transmission power level information having a value greater than the transmission power level transmitted by said station in case where the downlink communication traffic is increased to exceed a predetermined threshold level and a call setup request is received from said mobile terminal; and
- a step of transmitting said transmission power level information on said pilot channel;

said mobile terminal carrying out:
- a step of receiving said pilot channel from each of said radio base stations;
- a step of calculating a difference between the reception field strength of said pilot channel of each of said radio base stations and the first transmission power level information received;
- a step of detecting from the difference a first particular radio base station of a minimum propagation loss;
- a step of originating a call to said particular radio base station of a minimum propagation loss thus detected;
- a step of calculating a difference between the reception field strength of said pilot channel and the second transmission power level information upon execution of soft hand-over; and
- a step of determining a second particular radio base station for multiple access with reference to the difference.

4. A mobile communication system in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations storing transmission power level information having a value greater than a pilot channel transmission power level actually transmitted in case where a downlink communication traffic is small and transmits said pilot channel, or storing the transmission power level information having a value smaller than the pilot channel transmission power level actually transmitted in case where the downlink communication traffic is great and transmits said pilot channel;

said mobile station calculating a difference between a reception field strength of said pilot channel received from each of said radio base stations and the transmission power level information received on said pilot channel, and originating a call to a particular base station of a minimum propagation loss detected from the difference.

5. A mobile communication system as claimed in claim 4, wherein:

each of said radio base stations comprises:
- judging means for judging whether the downlink communication traffic is great or small;
- storing means for making said pilot channel to be transmitted store the transmission power level information having a value greater than the pilot channel transmission power level actually transmitted in case where the communication traffic is small in the judgement by said judging means or making said pilot channel to be transmitted store the transmission power level information having a value smaller than the pilot channel transmission power level actually transmitted in case where the downlink communication traffic is great; and
- transmitting means for transmitting on said pilot channel the transmission power level information stored by said storing means;

said mobile terminal comprising:
- receiving means for receiving said pilot channel from each of said radio base stations;
- difference generating means for calculating a difference between the reception field strength of said pilot channel of each of said radio base stations that is received by said receiving means and the transmission power level information received;
- detecting means for detecting a particular radio base station of a minimum propagation loss given by the difference calculated by said difference generating means; and
- call originating means for originating a call to said particular base station of a minimum propagation loss that is detected by said detecting means.

6. A mobile communication system as claimed in claim 4, wherein a code division multiple access system is applied to said mobile communication system.

7. A mobile communication system in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations storing transmission power level information having a value greater than a transmission power level transmitted by said station in case where the downlink communication traffic exceeds a predetermined threshold level and transmitting the transmission power level information on said pilot channel;

said mobile terminal carrying out multiple access with reference to the difference between the reception field strength of said pilot channel received from each of said radio base stations and the transmission power level information received on said pilot channel upon execution of soft handover when approaching its radio zone.

8. A mobile communication system as claimed in claim 7, wherein:

each of said radio base stations comprises:

judging means for judging whether the downlink communication traffic is great or small;

identifying means for identifying the case where the downlink communication traffic exceeds a predetermined threshold level in the judgement by said judging means;

generating means for generating the transmission power level information having a value greater than the transmission power level transmitted by said station in case where the threshold level is exceeded in the identification by said identifying means;

storing means for making said pilot channel store the transmission power level information generated by said generating means; and transmitting means for transmitting on said pilot channel the transmission power level information stored by said storing means;

said mobile terminal comprising:

receiving means for receiving said pilot channel from each of said radio base stations upon execution of soft handover when approaching its radio zone;

difference generating means for calculating a difference between a reception field strength of said pilot channel received by said receiving means and the transmission power level information; and determining means for determining a particular base station for multiple access with reference to the difference generated by said difference generating means.

9. A mobile communication system as claimed in claim 7, wherein a code division multiple access system is applied to said mobile communication system.

10. A mobile communication system in which communication is carried out through a radio channel between a mobile terminal and each of a plurality of radio base stations and each radio base station at first carries out notification of information through a pilot channel to said mobile terminal moving into a radio zone thereof, wherein:

each of said radio base stations storing first transmission power level information having a value greater and smaller than a pilot channel transmission power level being transmitted in case where the communication traffic is decreased and increased, respectively, and storing second pilot channel transmission power level information having a value greater than the actual transmission power level transmitted by said station in case where the downlink communication traffic is increased to exceed a predetermined threshold level and a call setup request is received from said mobile terminal;

said mobile terminal originating a call to a first particular radio base station of a minimum propagation loss detected from a difference between a reception field strength of said pilot channel received from each of said radio base stations and the first transmission power level information received on said pilot channel, and determining, upon execution of soft handover, a second particular radio base station for multiple access with reference to the difference between the reception field strength of said pilot channel and the second transmission power level information received on said pilot channel.

11. A mobile communication system as claimed in claim 10, wherein:

each of said radio base stations comprises:

judging means for judging whether the downlink communication traffic is great or small;

first storing means for making said pilot channel store first transmission power level information having a value greater and smaller than the pilot channel transmission power level actually transmitted in case where the downlink communication traffic is decreased and increased in the judgement in said judging means, respectively;

second storing means for making said pilot channel to be transmitted store second pilot channel transmission power level information having a value greater than the actual transmission power level being transmitted by said station in case where the downlink communication traffic is increased to exceed a predetermined threshold level and a call setup request is received from said mobile terminal; and transmitting means for transmitting said pilot channel in which the first or the second transmission power level information is stored by said first or said second storing means;

said mobile terminal comprising:

receiving means for receiving said pilot channel from each of said radio base stations;

first difference generating means for calculating the difference between the reception field strength of said pilot channel of each of said radio base stations that is received by said receiving means and the first transmission power level information received;

detecting means for detecting said particular radio base station of a minimum propagation loss with reference to the difference calculated by said first difference generating means;

call originating means for originating a call to said particular radio base station of a minimum propagation loss that is detected by said detecting means;

second difference generating means for calculating, upon execution of soft handover, the difference between the reception field strength of said pilot channel and the second transmission power level information; and determining means for determining said particular radio base station for multiple access with reference to the difference generated by said first or said second difference generating means.

12. A mobile communication system as claimed in claim 10, wherein a code division multiple access system is applied to said mobile communication system.

* * * * *